United States Patent [19]

Blanchard

[11] Patent Number: 4,567,480

[45] Date of Patent: Jan. 28, 1986

[54] TOUCH-SENSITIVE OVERLAY

[75] Inventor: Randall D. Blanchard, Woodinville, Wash.

[73] Assignee: John Fluke Mfg. Co., Inc., Everett, Wash.

[21] Appl. No.: 448,947

[22] Filed: Dec. 13, 1982

[51] Int. Cl.[4] .............................................. G09G 1/00
[52] U.S. Cl. .................................... 340/712; 340/706; 340/365 P; 340/711; 178/18
[58] Field of Search ............... 340/712, 711, 707, 706, 340/365 VL, 365 A, 365 P; 178/17 C, 18

[56] References Cited

U.S. PATENT DOCUMENTS

| | | | |
|---|---|---|---|
| 3,737,668 | 6/1973 | Ellis et al. | 340/365 P |
| 4,177,354 | 12/1979 | Mathews | 340/707 |
| 4,305,071 | 12/1981 | Bell et al. | 340/712 |
| 4,396,977 | 8/1983 | Slater et al. | 340/706 |
| 4,484,179 | 11/1984 | Kasday | 340/712 |

OTHER PUBLICATIONS

*IBM Technical Disclosure Bulletin*, vol. 24, No. 6, Nov. 81, "Optical Overlay Input Device for a Cathode Ray Tube", Harris, pp. 2732–2733.
*IBM Technical Disclosure Bulletin*, vol. 26, No. 6, Nov. 83, "Optical Keyboard Device and Technique", Callens, pp. 2763–2764.

*Primary Examiner*—Gerald L. Brigance
*Attorney, Agent, or Firm*—James P. O'Shaughnessy; Stephen A. Becker; Mikio Ishimaru

[57] ABSTRACT

A touch-sensitive overlay (20) for cooperative, optically proximate engagement with a visual display (22) of luminous character information (38) latently occupying one or more of a plurality of character locations (26) defined with a position-multiplexed coordinate array one from another, is comprised of a mask (44) of a photoreactive transducer (52) having at least one photoelectric parameter which varies as a function of incident light from the display of character information striking the transducer, and a signal circuit element (92) responsive to a variation in the photoelectric parameter in communication with the mask for developing a characteristic logic pulse indicative of the position of one or more character locations within the array upon a touch thereof and the coincident presence of character information thereat (48). In a highly preferred implementation, the visual display is a CRT display where the raster scan (24) and associated driving circuitry (96) provides the position-multiplexing of character locations and selective illumination thereof, while the photoreactive transducer is an open photovoltaic cell for developing a localized electric potential at luminous character locations, completed upon a manual touch by the operator at a selected location to develop an output voltage pulse indicative of the position(s) touched, which pulse is then employed to interrogate registers (98) associated with the raster scan circuitry in order to provide spatial determination of the location(s) corresponding to the coincident presence of a touch and luminous character information thereat.

34 Claims, 12 Drawing Figures

TOUCH-SENSITIVE OVERLAY

TECHNICAL FIELD

The present invention relates, generally, to a touch-sensitive overlay for operator interaction with a visual or graphic display of a host system such as a computer and, more especially, to an overlay which permits the localized identification of a position on the display upon a manual touch thereat by the operator. The touch-sensitive overlay of the present invention is adapted for association with any visual display where a plurality of character locations thereon are position-multiplexed within a coordinate array to define or otherwise discriminate one position from another. Accordingly, the instant overlay is capable of advantageous implementation in association with a CRT display where the raster scan is useful in providing a temporal base for character location identification, a time-multiplexed array of light-emitting devices where the multiplexing circuitry provides temporal identification for one location vis-a-vis another, or other similar display devices.

DESCRIPTION OF THE BACKGROUND ART

Computer technology is expanding at an enormous rate with seemingly boundless applications in virtually all fields of human endeavor. While initially confined to the domain of experts knowledgeable about and familiar with the hardware and software design capabilities of a given system, this technology has been extended to an extremely broad range of individuals of widely varying skills. At the forefront of this evolution is the desirability of providing simple but efficient means for operator interaction with what otherwise may clearly be a highly sophisticated computer system. To this end, great strides have been made to simplify the operational characteristics of computer systems in order to render the same accessible to even those who have no knowledge or specific educational background enabling them to understand the intricacies of a system with which they must deal. Along these lines, a plethora of devices are now provided for an operator to interact with a host system by direct contact with a visual display, thereby eliminating the need to resort to the use of a keyboard or the like.

Such direct interactive devices admit of many advantages over inputing data via, e.g., a keyboard. Many individuals are timid in "communicating" with a computer and this apprehension oftentimes contributes to error where information is introduced through a keyboard. The problem is exacerbated since the common tendency is to focus on the keys rather than on the visual display associated with the keyboard with consequent typographical errors; in turn reinforcing the psychological problem of interaction by the operator. Even single-function keys have not entirely overcome these problems and, in further point of fact, there is a practical limit to the ability of a manufacturer to provide a keyboard with a range of single-function keys coextensive with the contemplated uses of the system. Accordingly, the art has responded with various suggestions for visually interactive means permitting the operator to interface with a computer directly through a visual display therefor. Among these presently recognized in the art may be mentioned a light pen, a light beam array, capacitance-type switches, piezoelectric switches, surface accoustic wave transducers, resistive contacts, and resistive analog approaches.

Historically, one of the first commercial devices for direct operator interaction with a computer terminal through a visual display was implemented in the form of a light pen. In the main, this class of device is represented by a photodetector housed within an elongate member in the shape of a conventional pen. The light pen is manipulated by placing the photocell in proximate contact with the face of a CRT display at a desired location. As the raster scans the face of the CRT it causes illumination sufficient to trigger the photocell in the pen, the physical location thereof being correlated to the raster position at the time a pulse is detected. Usually a switch is included on the pen to enable the device when it is put in use; in order to avoid spurious signals. Two important points are pertinent as respects this light pen device. First, the vast majority of CRT driver (controller) chips have routinely included a light pen input to accommodate the device either as an integral component of a system or as an optional accoutrement. To date, the inclusion of a register accessible for a light pen input remains notwithstanding the second point worthy of comment—the light pen has not been a very successful approach from a commercial point of view. Its acceptability has principally been limited to the inconvenience of either holding the device in order to have it readily available or repetitively grasping it for use with the system. Accordingly, although technologically very acceptable, the device has not proven to be desirable from a user's standpoint.

Light beam arrays interrupted by the presence of a finger of the operator or other intrusive object have been proposed as a means for operator interaction with a host system. In some instances, these devices are implemented as horizontal and vertical arrays of light emitting diodes or the like and associated detectors disposed about the periphery of, e.g., a CRT display. The interposition of either an operator's finger or another opaque object interrupts a given light beam, the detection of which allows the characterization of the location of the interposed object. In one variant the light beams are columnated in order to provide physical discrimination of points within an X-Y gridwork. In other variations, the LED's are cycled "on" and "off" in a specific sequence so that at any given moment only appropriate ones of the emitter/detector pairs are energized in order to avoid the cost of beam columnation while nonetheless providing spatial discrimination. Still other approaches within this realm of optical touch panels include the use of a continuous light source with charge-couple devices ("CCD") configured as linear image sensors. These types of panels require a continuous light source about three sides of the display with two CCD linear image detectors mounted in the corners connecting the remaining side. The CCD's are mounted at angles whereby shadows caused through interposition of an object within the light field over the display will be received by both. A focusing device screens shadows from the CCD's except those from which precise touch locations may be determined by appropriately referenced trigonometric equations. Regardless of the specific mode of implementation, each of these approaches suffers one or more significant disadvantages. Each is (to varying degrees) particularly susceptible to intrusion from ambient lighting, and particularly the continuously illuminated panel last-mentioned above. Columnating a matrixed array of LED's is a fairly costly approach. While that is minimized to a certain extent by sequencing the emitter/detector pairs, the curvature of a conventional CRT display poses some significant problems in initial alignment and subsequent detection irrespective of the format of emitters and detectors. Then too, such an array may oftentimes require considerable hard-wiring to provide input/output function for the components constituting that array.

Capacitive touch panels are also known, and typically rely upon a glass panel with conductive surfaces screened on both front and back. In this way the glass intermediate the conductive surfaces serves as the dielectric. The touch-sensitive capacitance switch usually consists of two such capacitors in series which have identical capacitance values correlated to an engineering design for the average capacitance of human touch at about 50 picofarads. In operation, a low-level signal is continuously pulsed through this switch array; which signal is shunted to ground through the body capacitance when a finger touches the top plate of the switch. Spatial discrimination can be achieved by taking into account the timing of the pulse signal. Another, more elaborate approach involves the continuous monitoring of the reference capacitance of the untouched panel by a microprocessor. A touch by a finger tip causes a change which is identified and interpreted by associated electronics. While these capacitive touch panels extend the environmental range of adaptability for touch-sensitive overlays, they nonetheless suffer their own indigenous problems. Usually, the same must be designed with fairly wide spacing between signal traces in order to minimize the effects of stray capacitance. This can place some rather severe constraints on the number of touch-sensitive areas per overlay. This contributes, in turn, to the problem of limiting the field (i.e., physical presentation) of information on the display; in essence, the overlay defines the display field—a most undesirable result. Those overlays incorporating a microprocessor-based tracking system to improve reliability carry with them a proportionately higher cost.

Piezoelectric switches rely upon that (i.e., piezoelectric) effect to sense the presence of a touch. Somewhat related to the piezoelectric switch is the use of a surface accoustic wave to provide another type of touch-sensitive overlay. Instead of a pair of conductive surfaces screened on both sides of a glass substrate as was the case with respect to the capacitance switch mentioned above, a series of piezoelectric transducers are mounted along one X and one Y axis of the glass plate. These transducers generate an accoustic wave of ultrasonic (e.g., 4 MHz) frequency on the surface of the glass (usually about 1/16"). Touching the surface causes a reflection of the transmitted wave or echo which is recognized by other transducers. The time between the outgoing transmitted waves in both the X and Y direction and their reflections may be measured and are characteristic of the distance of the touched point from each of the X and Y axes. These piezoelectric overlays are rather difficult and hence expensive to manufacture. They are also very susceptible to environmental problems; the surfaces must be maintained scrupulously clean and free from scratches or nicks lest erroneous or spurious results obtain.

Membrane-type switches have also been proposed for operator interaction with a computer system. One approach is embodied in a resistive contact switch wherein the switch matrix is etched or otherwise imposed on an optically-clear polymeric substrate. Two such substrates are disposed in face-to-face relationship separated one from the other by a slight air gap. An operator pressing the outer one of the substrates will cause both pieces to touch and form a contact area which can be detected by digital circuitry for purposes of spatial discrimination. Another type of overlay within this ambit employs an A/D converter for both the X and Y axes. Comparison of the resistance values allows for spatial discrimination.

The foregoing generally constitute the types of overlays currently or heretofore in use. Those of simpler design have been found to suffer certain disadvantages. In addition to the drawbacks enumerated in general above, parallax problems can be significant. Alignment problems also pose considerable difficulties. For example, where an array of either switch contacts or light means are fixedly disposed over or about the periphery of a CRT display, the display image itself may vary in position over the course of time and/or in response to temperature fluctuations whereas the fixed overlay obviously will not. Hence, where a certain response is dictated by the location at which the display is touched, a shifting of the character locations (e.g., due to vertical or horizontal misalignment of the CRT) will yield an erroneous result. Interface circuitry is oftentimes unwieldy due, e.g., to numerous wires required by grid-work arrays of contact points. Efforts to overcome these drawbacks have resulted in devices which are quite complex and hence costly; eliminating adaptability for many applications if for no other reason than economic disincentive. Furthermore, many of the overlays heretofore in use irrespective of complexity or cost considerations suffer the drawback of limiting the useful presentation of information on the associated display; the overlay itself effectively defining the limits of the visual display.

Accordingly, the need exists to provide an improved touch-sensitive overlay for operator interaction with a computer system; which overlay is simple in construction, of low-cost, but which is reliable in operation regardless of any variations in the absolute position of the character locations on the display device.

SUMMARY OF THE INVENTION

The present invention advantageously provides an improved touch-sensitive overlay for operator interaction with a host system such as a computer or microprocessor system. The overlay of the present invention is particularly desirable for its simplicity of construction yet efficiency of operation. An additional advantage of the present invention is its ability to be implemented with very simple interface circuitry; thus leading to a further and distinct benefit of reduced cost, both in terms of initial fabrication and later day-to-day operation. The present invention is widely adaptable for use in association with a broad range of visual displays and without limiting the display itself in terms of the type or pattern of useful information presented thereon. Still a further benefit of self-alignment with the display is provided by the instant overlay.

The foregoing and other advantages of the present invention are realized in a touch-sensitive overlay for cooperative, optically proximate engagement with a visual display of luminous character information latently occupying one or more of a plurality of character locations defined within a position-multiplexed coordinate array one from another, comprising a mask of a photoreactive transducer disposed over the display intermediate same and an operator for the host system destined for a touch by the operator to identify or otherwise select to some good advantage one or more character locations, which transducer possesses at least one variable photoelectric parameter as a function of incident light from the display of character information impinging upon or striking same, and signal means in communication with the mask for developing a characteristic logic pulse indicative of the position(s) of character information within the coordinate array upon a touch of the position(s) and coincident presence of character information thereat in response to a variation in the photoelectric parameter(s).

The visual display with which the aforementioned overlay is associated may be any display having the combined capabilities of presenting visual character information, including alphanumeric characters or desirable symbolic representations, in a luminous form at selected locations on or about the display—which normally can and will vary over time from application to application—and wherein one character or symbol location may be discriminated from another (i.e., position multiplexed). In most cases, position multiplexing of characters will be defined on a temporal base as is the case with, e.g., a CRT visual display, a DC plasma visual display, a time-multiplexed light emitting diode (LED) display or the like. Notwithstanding a preference for position discrimination on a temporal base, other bases (e.g., analog comparisons) might equally well be utilized for this purpose. In the case of a highly preferred application where the instant overlay is combined with a CRT display, the raster scan and associated control/monitoring circuitry provide the temporal base for discriminating one location from another, whereas the multiplexing circuitry responsible for the presentation of data in other displays such as those specifically enumerated above will serve that function. Further within this general aspect of the invention, the character information presented via these displays latently occupies a plurality of potential locations which will be selectively illuminated in order to present a useful or meaningful display to the operator and may take on one of several forms including, for example, an X-Y coordinate array or a polar coordinate array; albeit, any display meeting the broader criteria set forth above will be found suitable for use with the present overlay (e.g., selectively illuminated light wires, back-lit panels, etc.).

The photoreactive transducer of the overlay of the present invention serves to convert luminous character information into a measurable electric characteristic (e.g., voltage, current or resistance) or a change in an established electrical characteristic thereof. In most cases, the photoreactive transducer will preferably be responsive to the presence (or intensity) of luminous character information and convert incident light from the display at appropriate luminous character locations into the measurable electric response; however, under certain circumstances, the photoreactive transducer may be employed to be responsive to the *absence* of luminous characters at selected locations on the display. Within the more preferred environment, the photoreactive transducer may be comprised of a photovoltaic cell for developing a localized electric potential at luminous character locations in response to the presence of character information thereat. Along those lines, the photovoltaic cell is most preferably an open cell which may take the form of a continuous mask over the display or may be implemented as a plurality of discrete cells disposed in a cell array over the display. Where a continuous mask is employed, the cell is an optically transparent cell in the sense that it is capable of optical transmissibility of visual information appearing on the display through the overlay to the system operator. A most preferred photovoltaic cell for that purpose is one comprised of a cadmium sulfide/cuprous sulfide cell having a light-responsive junction. Where the discrete cell array is employed, the cells themselves need not possess optical transparency provided cell sizing and spacing are regulated to provide visual perception of the display by the operator.

In other aspects of the invention, the photoreactive transducer may be one comprised of a composition having variable photoresistivity, in the sense that electrical resistance varies as a function of incident light striking the transducer mask. Most preferably, an optically transparent mask of cadmium sulfide is employed in such embodiments; although, a non-transparent cell composition may be employed in the same type of discrete cell array summarized above.

Other photoresponsive devices may be utilized in lieu of the foregoing, provided the same exhibit either the development of, or the change in, a measurable electric parameter upon illumination. Exemplary of such other varieties of transducers may be mentioned Schottky devices. However, any device meeting the functional requirements summarized above may be utilized to serve this function.

Irrespective of the specific photoreactive transducer employed, the development of (or change in) the appropriate photoelectric parameter is employed to develop in turn a characteristic logic pulse indicative of the physical position on the display touched by the operator, either by means of the operator's finger or, in certain aspects of the invention, an object manipulated by the operator. A contact is made with the photoelectric transducer at an optically transparent, electrically conductive film, preferably supporting the transducer structure. Suitable films include those of tin oxide, indium-tin oxide and gold, amongst others.

Viewing the most preferred embodiment of the present invention as exemplary in order simply to summarize the operational characteristics of the present invention, the same is comprised of a mask of an open photovoltaic cell borne upon a thin-film, such as one of those films noted above, deposited upon a reinforcing glass substrate disposed over a CRT display. The presentation of luminous character information on the CRT display results in the development of localized electric potential within the cell(s) lying optically proximate those luminous character locations. Touching a selected luminous location completes the cell at that point as the raster scans across the display, giving rise to an output voltage pulse. This pulse (preferably shaped to a logic pulse) is thence employed to interrogate the CRT driver in order to read the location of the raster at the time the pulse was developed. Hence, spatial discrimination of one or more illuminated character locations is achieved.

In alternate embodiments of the present invention, the visual display may be one for presenting a plurality of back-lit character locations selectively illuminated to present one or more discrete luminous display areas. For example, a display panel may be selectively illuminated to present the operator of a system with a plurality of optional steps one of which is to be selected.

Disposed over the array is a photoreactive transducer such as one of those transducers summarized above. Touching the area corresponding to a desired step or sequence of steps creates an input to the system indicative of that choice.

Fabrication methodology of the present invention is very simple while resulting in a highly reliable device of good integrity. The preferred photovoltaic cells may be formed by first depositing the optically transparent, electrically conductive film upon a supporting substrate and then coating the film with a desired precursor, following which the active cell may be formed by appropriate chemical reaction. Discrete cell locations may be formed by the intermediate step of applying a photoresist or the like to preclude reactivity in subsequent steps outside the active areas within the resist film. In some cases, the transducer mask will then be completed by the application of an optically transparent coating to protect the cell elements. In other embodiments, an outer cell electrode is included by depositing a thin-film of an optically transparent, electrically conductive material on a resilient substrate and then spacing that cell electrode outwardly proximate the remaining cell structure for ultimate contact therewith upon a touch by the operator. Only a single lead is required for purposes of interface in those situations where the cell receives the outer protective layer, with the operator's body providing the completed circuit path for the interrogating electronic circuitry. Where the outer cell electrode is incorporated, only two leads are required for interfacing purposes, one of each associated with a respective one of the optically transparent, electrically conductive films.

Other advantages of the present invention, and a fuller appreciation of its construction and mode of operation, will be gained upon an examination of the following detailed description of the preferred embodiments, taken in conjunction with the figures of drawing.

DETAILED DESCRIPTION OF THE PREFERRED EMBODIMENTS

The present invention relates, generally, to devices allowing the operator of a host system such as a computer or microprocessor system to interact with same directly through a visual display therefor, and more especially to a touch-sensitive overlay whereby an operator may interact directly with the host system merely by applying a manual touch to a selected region of the overlay. Accordingly, the present invention will now be described with reference to certain embodiments within the aforementioned context; albeit, those skilled in the art will appreciate that such a description is meant to be exemplary only and should not be deemed limitative.

Construction and Operation of the Preferred Embodiments

Figure 1:
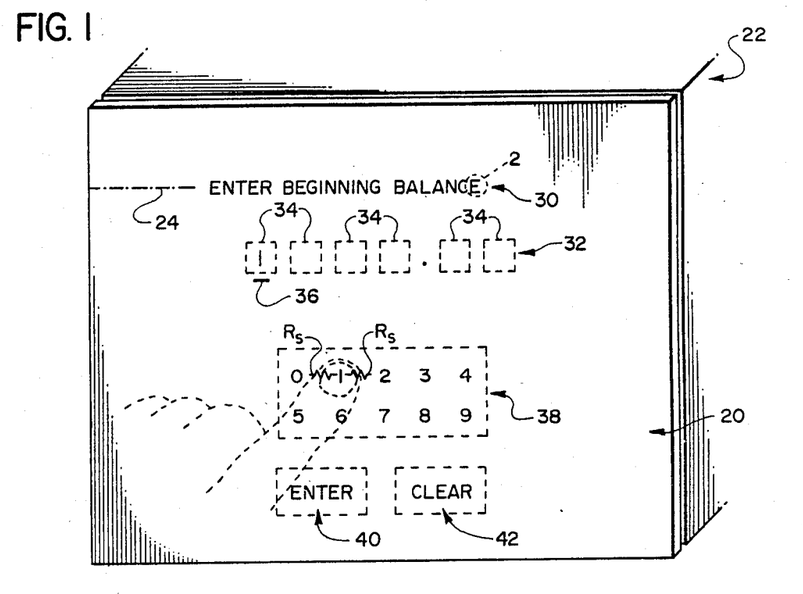
FIG. 1 is a diagrammatic view of a visual display and an overlay in accordance with the present invention, showing an exemplary situation requiring operator interaction with a host system by manually touching the overlay in order to input required data.

Turning to the figures of drawing, in each of which like parts are identified with like reference numerals, FIG. 1 illustrates diagrammatically a touch-sensitive overlay in accordance with the present invention, designated generally as 20, associated with a CRT display identified as 22. In order simply to exemplify one environment within which the overlay 20 will find good utility, the display 22 is a cathode ray tube (CRT) display for a host computer system (not shown), such as a home computer programmed to provide the user with a number of general purpose routines—in this illustration, one for balancing a bank account. Within this context, it is normally to be assumed that the user is one totally unfamiliar with the intricacies of the host system but one who, nonetheless, must interact therewith in order to achieve a useful result. Typically, the software contemplates these situations and instructs the user step-by-step throughout the routine, thereby simplifying the procedure. Obviously, touch-sensitive overlays are used in a much broader range of applications, including some very sophisticated utilities. Nonetheless, the basic principles of the overlay of the present invention are equally applicable regardless of that consideration, as will be appreciated as this description ensues.

Figure 2:
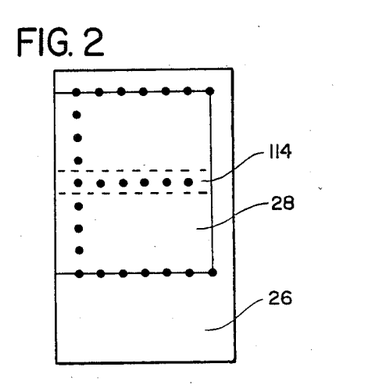
FIG. 2 is a highly enlarged view of the character location within the encircled area identified as 2 in FIG. 1.

As is conventional, the CRT display 22 provides a visual display of luminous characters as a raster 24 scans across and thence sequentiually down the display screen. Typically, about 200 display lines are provided downwardly across the face of the screen, with about three such raster lines being illuminated at any given time, due to and depending upon the persistence of the phosphor comprising the screen itself. As the operation of CRT displays is notorious, detailed discussion of the construction and mode of operation of display 22 is not warranted herein. Suffice it to say that the raster 24 is generally capable of developing a luminous character anywhere within the confines of the screen of CRT display 22 and, accordingly, character information latently may occupy any of a plurality of the character locations defined by the scanning raster. One such location is shown in a highly enlarged view in FIG. 2, where a field 26 is defined as being eight dot locations in width and 14 scan lines in height with a reduced character field 28 being limited within the broader confines of field 26 as an area having a width of seven dots and a height of nine scan lines; these individual character locations being considered in somewhat greater detail below.

Returning to a consideration of FIG. 1, the host system has presented through the CRT display 22 an instructional step "ENTER BEGINNING BALANCE" within a field identified as 30. Immediately beneath the same is a field 32 comprised of latent character locations 34 within which will be entered the required balance information. A cursor 36 appears beneath that character location 34 within which a selected digit is to appear, the digit "1" having been entered by the user in the first location. That information is entered within the field 32 by the user touching the corresponding digit location within a field 38, as shown in phantom where the user's finger is applied to the digit "1". After that initial digit is entered, the cursor 36 will index to the next character location 34 and the appropriate digit entered therein the same manner, by touching the proper location within the field 38. After the character information is loaded within the entry positions in field 32, the user may touch a field 40 bearing the legend "ENTER" in order to transfer the balance information to the host system. Subsequently, the display may then present an instructional step for the user to load withdrawals from the account in order to continue with the routine. In the event an incorrect digit is touched by the user, an area 42 bearing the legend "CLEAR" is provided to reset the field 32 in order to enter correct information. In any event, the user interacts with the host system simply by observing a display on the CRT 22 and touching the overlay 20 in the manner directed by the system, greatly simplifying interaction and broadening the population of potential system users.

Figures 3, 5:
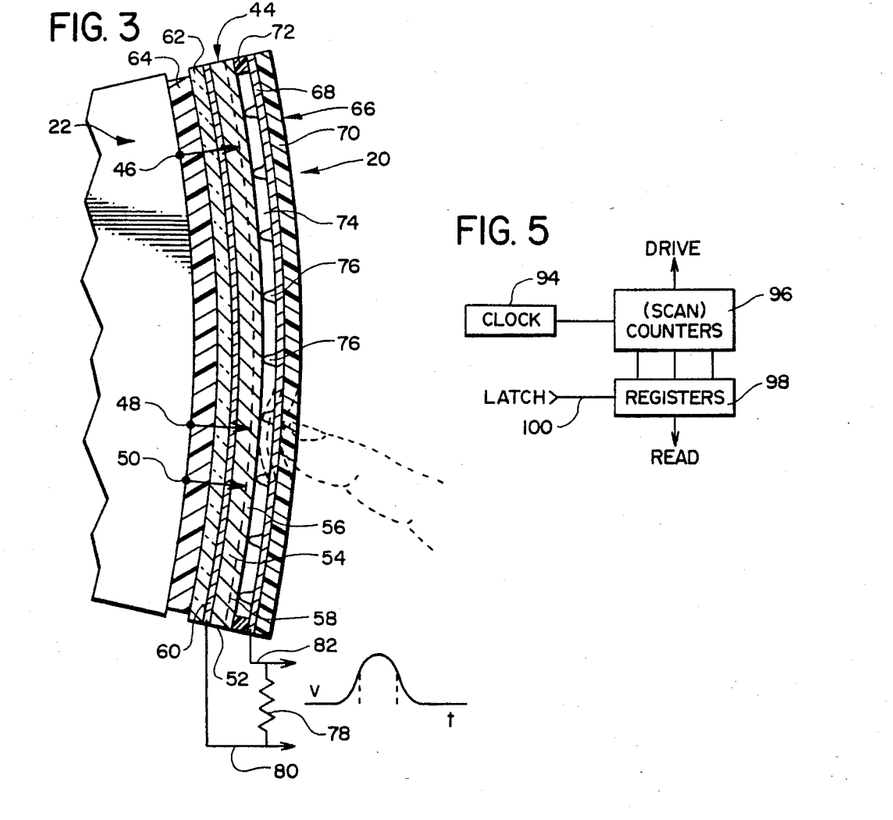
FIG. 3 is a sectional view through an overlay in accordance with one embodiment of the present invention, shown associated with a CRT display, with the components constituting the overlay shown on an exaggerated scale for purposes of clarity.
FIG. 5 is a block diagram illustrating the CRT driver for the display of FIG. 3, showing the manner in which that circuitry is interrogated to discern the physical location on the display touched by the operator.

FIG. 3 is a sectional view showing the touch-sensitive overlay 20 in cooperative, optically proximate engagement with the CRT display 22. The overlay 20 is comprised of a photoreactive transducer designated generally as 44 which serves to convert luminous character information within the position-multiplexed array of characters appearing on the CRT 22 into a measurable photoelectric response. A wide range of photoreactive transducers may be employed for this purpose provided the same are characterized as having at least one photoelectric parameter which varies as a function of incident light from the display 22. In this instance, the transducer 44 responds to the presence of incident light from luminous characters on the display 22 as represented generally at positions 46, 48, and 50. However, depending upon the type of transducer employed, the photoelectric response may equally well be correlated to the absence of luminous information at a given location as detected by a change in a steady state condition existing therein.

In the embodiment shown in FIG. 3, the photoreactive transducer 44 is comprised of a mask of an open photovoltaic cell 52 shown here to be a continuous mask of a photovoltaic semiconductor having a first compositional layer 54 separated from a second compositional layer 56 by a junction 58. The junction 58 in this embodiment is a light-responsive p-n (or n-p) semiconductor junction. Thus, the incident light from the locations 46, 48 and 50 striking the junction 58 will cause the creation of electron/hole pairs as is conventional in semiconductor devices of this sort resulting, in turn, in the development of a localized potential across the cell 52. In this preferred embodiment, the photovoltaic cell 52 is borne upon a thin-film 60 of an optically transparent, electrically conductive material. The film 60 is supported upon a substrate 62, in this case the standard implosion plate conventionally associated with a CRT tube. The implosion plate 62 is bonded to the face of the CRT 22 by a polymeric medium 64 as is also conventional.

The cell 52 is an open photovoltaic cell as shown in the embodiment of FIG. 3. Accordingly, the development of the localized potentials at the regions of the junction 58 in response to the incident light will remain static. An outer cell electrode designated generally as 66 is included in this embodiment for the purpose of completing the cell in order to generate a usable voltage pulse indicative of a position touched by the operator. The outer cell electrode shown in FIG. 3 is comprised of a thin film 68 of an optically transparent, electrically conductive material supported upon a flexibly resilient substrate 70 which also possesses optical transparency. The cell electrode 66 is disposed in spaced relationship from the cell 52 by peripheral spacer means 72 in order to yield a gap or void area 74 between these components. Optionally, but preferably, a plurality of non-conductive spacers 76 are screened or otherwise deposited upon the inner surface of the film 68 in an array about its interior dimensions to guard against an inadvertent contact and thereby insure that only the positive touch by the operator, as shown in phantom lines, results in contact between the outer cell electrode 66 and the open cell 52.

When the outer cell electrode 66 is depressed by the operator, using either a finger or an object such as a stylus to depress it, contact between the conductive film 68 and the cell 52 will complete a current path allowing for the development of a voltage pulse (as illustrated in FIG. 3) across an output resistor 78, disposed between output leads 80 and 82 associated with the conductive films 60 and 68 respectively. More specifically, as the raster 24 scans the CRT 22 and excites the phosphor screen thereof, illuminated character locations will transmit light energy as illustrated at points 46, 48 and 50. As noted above, this light energy will be converted to an open cell potential by the photovoltaic cell 52 serving in this embodiment as the photoreactive transducer for the overlay 20. The raster scan is very fast, sweeping the entire display usually at 50 or 60 complete scans per second where each scan is comprised of, e.g., 224 individual scan lines. Where the operation has touched the screen and completed a circuit across the transducer cell 52, the presence of a luminous character at point 48 will allow that voltage developed in the photocell 52 to appear across the load resistor 78; the configuration of the pulse being a function of, inter alia, the speed and persistence of the phosphor employed and the relative size of the load resistance 78 vis-a-vis the surface resistivity of the components constituting the transducer 44. The voltage pulse developed across resistor 78 is then utilized to interrogate the CRT controller as described more fully below in order to identify the precise location of the raster scan at the time the pulse occurs. This yields the ability to discriminate spatially the location corresponding to the point 48 from, e.g., those points identified 46 and 50 simply by touching that point. The ability to achieve spatial discrimination in the context of the embodiment of FIG. 3 can be made within very exacting dimensional limits.

As noted in general above, the raster scan maintains approximately three luminous scan lines at any point in time, progressing downwardly for each complete scan of the face of the CRT 22. The speed of scanning in combination with the persistence of the phosphor gives the appearance of a relatively continuous presentation of luminous character information on the screen. However, as can be seen with reference to FIG. 2, each character location has a height greater than the three scan line illumination normally provided; leading to excellent vertical discrimination of one character location from another. Horizontal discrimination (i.e., along the same scan line) is achieved in the context of a continuous mask of FIG. 3 by interrogating the CRT controller with the voltage pulse (also shown in FIG. 3) in combination with the establishment of a suitable biasing threshold. That threshold is achieved, in part, by selecting the value of the load resistance 78 in light of the lineal resistivity of the transducer 44, and principally the layer 56, with due consideration for the speed of both the rise and decay of the phosphor employed on the CRT screen. More specifically, and with reference to FIG. 1, the physical location between the digits "1" and "2" may be represented by an equivalent resistor $R_S$ which will vary both with respect to the composition of the cell 52 and the dimensional separation of the two locations. A similar condition obtains in respect of the difference in position between the digit "0" and the selected digit "1" for this example. As the raster scans across a line through the first row of digits in field 38, a localized potential will be developed at each illuminated location. Sizing the resistor 78 to be a fraction of the surface resistivity $R_S$ will establish a voltage divider network attentuating the voltage seen by the load in respect of the nonselected regions for the digits "0" and "2" vis-a-vis the selected digit "1". This will develop a voltage pulse having a generally Gaussian-shape, peaking at the touched location for the digit "1". Establishing a restrictive band width as shown generally in phantom lines in FIG. 3 for the voltage pulse centered about the peak at a voltage level in excess of the anticipated contributions from the non-selected digits "0" and "2" provides the required horizontal discrimination among locations on the same scan line.

Figure 4:
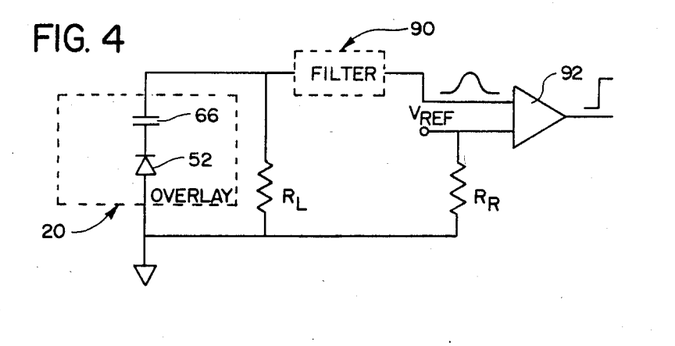
FIG. 4 illustrates the equivalent circuit for the overlay of FIG. 3 and the associated interface electronics for developing a characteristic logic pulse indicative of the physical location on the CRT display touched by the operator.

FIG. 4 illustrates schematically the equivalent circuit for the overlay 20 and the interfacing electronics between it and the CRT controller for the display 22; pointing up the elegant simplicity of the system. The overlay 20 is shown within a dashed outline to be comprised of an equivalent photodiode 52 and a switch contact representing the outer cell electrode 66. Upon a manual touch of the outer cell electrode to complete the circuit and the coincident presence of the luminous character from point 48, the diode 52 will conduct and develop the voltage pulse across the load resistor 78, shown as $R_L$ in FIG. 4. Optionally, but preferably, a filter shown in phantom and designated generally as 90 will be employed to reduce noise appearing on the voltage pulse due, e.g., to horizontal retrace or simple common mode noise from other electrical apparatus in the vicinity of the device. The characteristic voltage pulse is applied as a first input to a comparator 92 while a reference voltage $V_{REF}$ developed across a reference resistor $R_R$ for establishing the desired threshold or enabling band width is applied as a second input to the comparator. In turn, a logic pulse output is achieved. That logic pulse is employed to interrogate the CRT controller, shown schematically in FIG. 5.

FIG. 5 illustrates, and on a simplified basis, a conventional CRT controller and one which includes a light pen input noted in general above to be a rather standard feature in most commercial controller chips. In capsule sum, the circuit includes a clock 94 which generates a train of pulses responsible for timing the scan of the raster. The clock output communicates with scan counters 96 for that purpose in order to control the position of the raster throughout and over its sweeps responsible for generating the display on the CRT 22. A first output from the counters 96 drives the raster while registers 98 receive location information monitoring the position of the raster over the course of time. A latch input 100 (e.g., the "light pen" input) receives the logic pulse output of comparator 92 to interrogate the registers 98 for the purpose of reading the "instantaneous"location of the raster scan. In this way, the voltage pulse developed upon a manual touch of the overlay 20 and coincident presence of luminous character information, suitably converted to "TTL", interrogates the registers 98 and identifies precisely the location touched. This information may then be utilized by the host system in order to respond in accordance with the information entered by the user upon that touch.

Figures 6, 8:
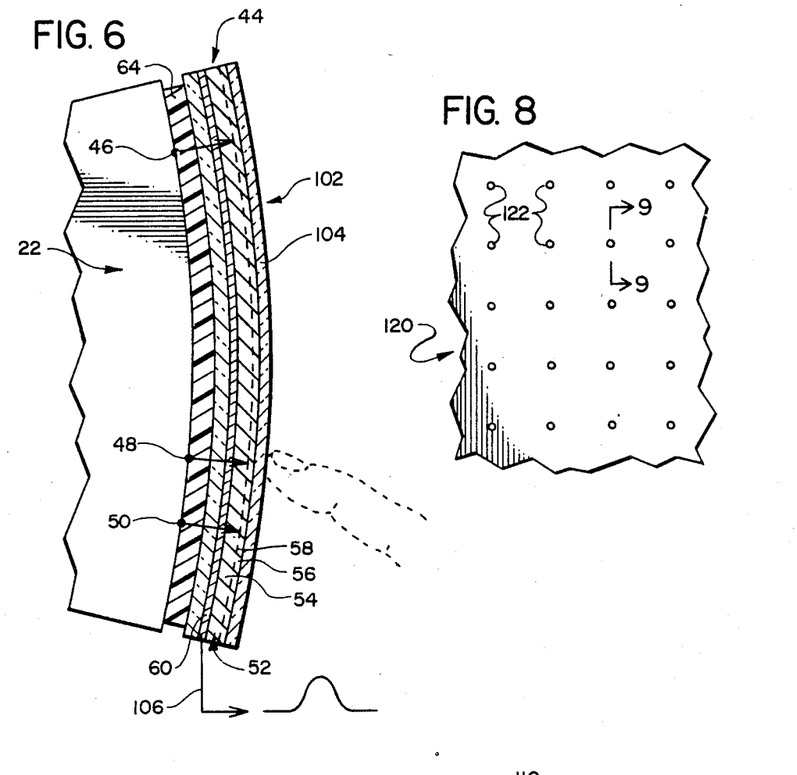
FIG. 6 is a sectional view, similar to FIG. 3, but showing an overlay in accordance with an alternate, preferred embodiment of the present invention.
FIG. 8 is a fragmentary plan view of an overlay in accordance with still another preferred embodiment of the present invention, wherein a plurality of discrete cells are employed as a photoreactive transducer.

FIG. 6 illustrates an alternate but nonetheless highly preferred embodiment of a touch-sensitive overlay in accordance with the present invention, identified generally as 102. It will be appreciated that the overlay 102 is virtually the same as the overlay 20, save the deletion of the outer cell electrode 66 and the addition of a protective overcoating 104 directly upon the transducer cell 52. Otherwise, the construction of the overlay is the same and its functionality highly analogous to that described above with reference to FIG. 3. The overcoat 104 in this embodiment is an optically transparent material and preferably one having dielectric characteristics. Its purpose is to protect the components of the photovoltaic cell 52 constituting the photoreactive transducer responsible for converting the light input from the display into a measurable electric quantity (in this case, an open cell electric potential). Elimination of the outer cell electrode carries with it the elimination of one of the lead lines, leaving but a single output 106 for communication with the interfacing circuitry. In this embodiment, a manual touch by the operator completes the circuit, as shown in phantom where the operator's finger touches the overlay 104 outwardly proximate the illuminated location 48. In this manner, the operator's body capacitance serves to develop the voltage pulse on output line 106 for creating a TTL pulse used to interrogate the CRT controller previously described with reference to FIG. 5.

Figure 7:
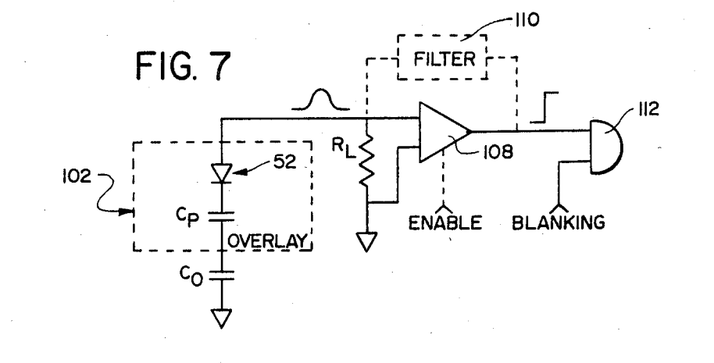
FIG. 7 is a schematic diagram showing the equivalent circuit for the overlay of FIG. 6 and the associated interfacing components.

FIG. 7 shows schematically both the equivalent circuit for overlay 102 and the associated interface electronics—again evidencing the simplicity of the present invention in stark contrast to prior approaches to this end. The overlay 102 is shown within the phantom outline to be comprised of the photoresponsive cell 52 illuminated from point 48 on the CRT display. The capacitance of the display itself is represented by $C_P$ in series with the capacitance of the operator's body identified as $C_O$ leading to ground. When the operator touches the overlay 102 and completes the circuit, a voltage pulse will be developed across the load resistance $R_L$ generally equivalent to the load resistance 78 of the previous embodiment. Because this circuit is single ended, it is preferred in this case to apply the voltage pulse as an input to an operational amplifier 108 as opposed to the use of a simple comparator such as 92. In this setting, both stray capacitance and the effects of noise, such as that generated during horizontal retrace and common mode noise, require more elaborate precautions to avoid spurious pulses which might otherwise interrogate the CRT controller circuit at inappropriate times. Several suggested features are represented in FIG. 7 to eliminate these unwanted results. For example, a feedback filtering network 110 might be utilized, as is generally conventional with operational amplifier circuits, to counteract noise and yield a reliable TTL pulse. That pulse itself may then be applied to an AND gate 112 as a first input and to which is applied a blanking input allowing the gate to pass a pulse only during active trace time as opposed to retrace portions of the sweep. Another suggested approach is the inclusion of enable circuitry for the operational amplifier 108 allowing it to operate only during selected times. For example, due to the speed of raster scanning in a CRT, it is possible to dedicate one sweep to only the central portion of each character location such as that identified in phantom lines as 114 in FIG. 2. The voltage pulse developed upon a manual touch of the overlay 102 is applied as shown in FIG. 7 to the amplifier 108 but is capable of being processed to the TTL pulse only when that circuit is enabled by the presence of luminous information within the phantom zone 114 of the character location. The foregoing constitute but a few suggested approaches with an eye toward contending with noise sources; but those skilled in the art will appreciate that many other procedures may be devised depending upon the design considerations and exigencies of the particular application at hand. In any event, the TTL pulse developed through the interface of FIG. 7 is applied to the latch input 100 of the registers 98 in exactly the same manner as described above in order to identify the precise location touched by the operator for further processing by the host system.

Whether the embodiment of FIGS. 3 and 4 or that of FIGS. 6 and 7 is selected for implementation, it may be found necessary or desirable to include a delay in the "Read" circuitry of FIG. 5 to account, e.g., for system delay in the generation of the interrogating pulse as a response to the presence of luminous data on the display. Even using a "fast" phosphor (i.e., one with a steep rise time) may not yield a pulse precisely correlated (temporally) with the position of the rapidly scanning raster. A slight delay will be useful in that situation to achieve more precise discrimination.

The embodiments of FIGS. 3 and 6 include a continuous mask of the photoreactive transducer extending entirely across the surface area of the visual display. In those cases, a requirement of the photoreactive transducer is that it be optically transparent; that term connoting in this context transparency to a degree permitting visual perception of the display by the operator at a comfortable viewing level. A certain class of materials described more completely below in respect of fabrication of the instant overlay fulfills that requirement and also provides sufficient surface resistivity for the mask that horizontal discrimination of one character location from another may be achieved as noted hereinabove. Under certain circumstances, however, it may be found more advantageous or desirable to form the photoreactive transducer as a plurality of discrete cells disposed over the display in a cell array. For example, the useful range of materials adaptable for the photoreactive transducer is considerably broadened by eliminating the constraint of optical transparency while nonetheless providing the desirable photoelectric response. Additionally, forming the mask as a plurality of discrete cells isolated electrically one from another overcomes the need to be concerned with limitations on horizontal discrimination by effectively increasing the surface resistivity between cell locations to an open circuit condition. Either or both of those functional requirements may be found by the skilled artisan to be of sufficient importance to warrant the fabrication of the overlay in the discrete cell form. Such a device is shown in FIGS. 8 and 9.

FIG. 8 illustrates on an enlarged scale a portion of a touch-sensitive overlay designated generally as 120 comprised of a plurality of discrete photoreactive transducers 122 disposed in a spaced matrixed array, in this case an X-Y coordinate array. Were the coordinate array for the presentation of data on the visual display to be, e.g., in a polar system, then it might be found desirable to conform the cell array to the same geometric base. In any event, each of the cells 122, best viewed in FIG. 9, functions in much the same manner as the continuous masks described above with reference to FIGS. 3 and 6. Turning specifically to FIG. 9, a display screen 124 presents an illuminated character or symbol at a point 126, the incident light beam traversing a bonding junction 128 between the display surface and a glass substrate 130 on which the cells 122 are formed. Each cell in this exemplary embodiment is again shown to be an open photovoltaic cell, comprised of a first layer 132 and a second layer 134 disposed across a light-responsive junction 136. Each cell 122 is preferably supported laterally within the cell array by an optically transparent film 138 which allows visual perception of the display 124 by the operator. Typically, the supporting layer 138 will be comprised of the precursor composition for each cell 122 which has been masked to prevent the formation of a photoreactive area outside the defined cell locations. The overlay 120 may include the same type of outer cell electrode as was associated with the embodiment of FIG. 3 in order to provide a means for the operator to complete the open cell upon a manual touch. It is equally well envisioned that the overlay 120 will be completed by the deposition of an outer hard coat layer 140, as shown in phantom lines in FIG. 9, to yield the same type of overlay described with reference to FIG. 6, save the photoreactive transducer is now in the form of discrete cells vice the continuous cell described in respect thereof. Accordingly, a thin film 142 of an optically transparent, electrically conductive material will be provided intermediate the cells 122 and the supporting glass substrate 130 as will an associated single lead 144 to permit electrical communication between the cells 122 and the interface circuitry. In this instance, the same interface circuitry of FIG. 7 may be employed to develop a TTL pulse for the purpose of interrogating the display controller in order to provide a means for identifying the position of the character location touched by the operator.

Figure 9:
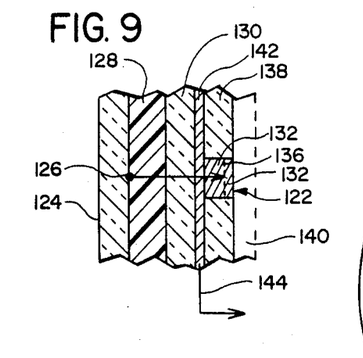
FIG. 9 is a sectional view, taken substantially along the line 9—9 of FIG. 8, showing one cell location.

When the discrete cell embodiment such as that of FIGS. 8 and 9 is selected, each of the cells 122 may be optically transparent and, as the same are enveloped within an optically transparent layer 138, visual perception of the display information by the operator is readily accommodated. However, it may well be that the components for or fabrication methodology of each cell 122 renders the same opaque or of such reduced optical transparency that visual perception is either unacceptably impeded or perhaps prevented altogher. In these latter cases, cell size and spacing are important considerations in order to yield a useful display. It has been determined that a cell having a dimension on the order of about 0.005" will be found to provide a characteristic pulse recognizable by conventional circuit elements within the interface circuitry while the collective surface area of all cells on the order of about 10–15% of the total surface area of the display itself will permit adequate visual acuity for information appearing on the display 124. Furthermore, as the supporting material 138 possesses substantial electric resistance (approaching open circuit resistance) a fairly sharp voltage pulse may be developed as one cell enjoys electric isolation from adjacent cells when the most preferred sizing and spacing noted above are maintained.

Figure 10:
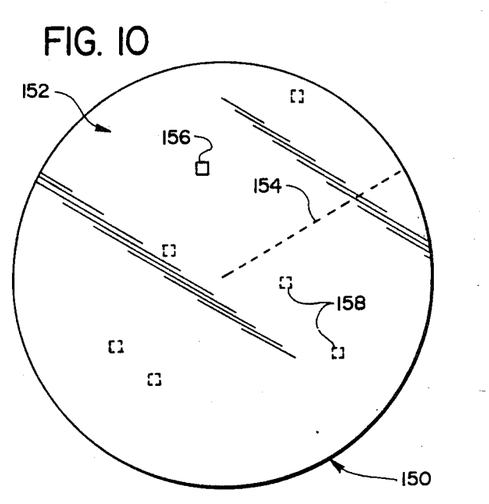
FIG. 10 is a diagrammatic representation of a radar indicator and an associated overlay in accordance with the present invention.

The foregoing embodiments have emphasized the use of a conventional CRT display where character information is presented in an X-Y coordinate matrix of locations. However, the principles set forth herein are equally applicable where the coordinate array is other than in an X-Y gridwork; including, for example, arrays based upon a polar coordinate system. FIG. 10 illustrates one such application.

FIG. 10 shows a conventional radar indicator designated generally as 150 having an overlay in accordance with the invention designated generally as 152. In this context, a raster 154 scans a circular path about the indicator 150 and provides illuminated target information as shown for example at point 156 and phantom points 158. For the sake of illustration, let it be assumed that the radar is one employed for controlling aircraft and the operator is in the process of routing an aircraft represented at point 156 to an airport location while maintaining appropriate awareness of aircraft identified in phantom at 158 as is expected within such an application. Further for the sake of exemplification, let it be assumed that a host computer system is associated with the radar for the purpose of maintaining an accurate monitor on all aircraft within the zone surrounding the airport. The touch-sensitive overlay 152 allows the aircraft controller to apply a manual touch thereto at the indicated position of the aircraft at point 156 for the purpose of providing an input to the computer for identifying both the controller in communication with the aircraft and the precise aircraft being controlled. Such information may be utilized to whatever beneficial purpose might be desired by the system designer and warrants no further consideration herein. As respects the precise construction of the overlay 152, however, several points warrant specific mention.

The same cooperative interrelationship between the indicator 150 and overlay 152 is established in the embodiment of FIG. 10 as has been described hereinabove. The application of a manual touch to the desired character or symbol location (i.e., 156) and the coincident presence of luminous character information thereat as developed by the raster scan 154 will give rise to a recognizable signal useful for interrogating the raster scan circuitry and collateral identification of the precise point touched. The overlay 152 may be comprised of the same type of continuous cell as that of FIGS. 3 or 6, depending upon whether or not an outer cell electrode is included or omitted (respectively). Likewise, discrete cell locations may be established in the overlay 152 as shown in FIGS. 8 and 9. However, because of the circular geometry of the indicator 150, it is most preferred that the geometry of the cell array conform to the same type of polar coordinate system as opposed to the X-Y matrix array shown in FIG. 8. And too, the individual cells in such a discrete cell array could be either optically transparent or opaque; in the latter case with due consideration for both sizing and spacing to insure adequate visual perception of the indicator by the operator.

Figure 11:
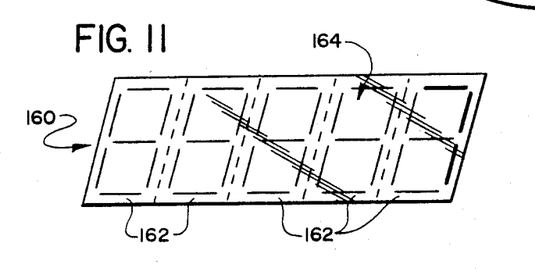
FIG. 11 is a diagrammatic representation of a matrixed array of light emitting diodes constituting a visual display associated with an overlay in accordance with the present invention; and, FIG. 12 is a diagrammatic representation of a back-lit display representing the operator with three optional sequences for a host system, one of which is to be selected by a manual touch of an overlay in accordance with the present invention associated with that display.

FIG. 11 shows yet another alternate application for a touch-sensitive overlay in accordance with the present invention. The embodiments noted above employ a raster scan and associated scan control circuitry to provide a temporal base indicative of position-multiplexed character information on the visual display. FIG. 11 represents a conventional "seven-segment" LED display employed in many applications to present alphanumeric information. The display of FIG. 11, designated generally as 160, is shown to include five separate display locations each identified as 162. In turn, each character location contains the familiar seven-segment display of LED's as shown in phantom lines, which may be selectively illuminated to present a desired alphanumeric symbol; such as the numeral "7" shown in the last display position. In order to reduce overall power consumption of such a display, it is customary to cycle the individual LED's on and off, for which purpose a time-multiplexing circuit is provided. Accordingly, the time-multiplexing logic will serve to provide a temporal base by which to identify one location vis-a-vis another within the array of display 160, or even a given one or more segments comprising an individual character location. A touch-sensitive overlay 164 in accordance with the present invention is disposed over and in optically proximate engagement with the LED display 160; the overlay 164 being shown in this exemplary embodiment to be a continuous mask of a photovoltaic cell such as the mask shown in FIGS. 3 or 6. A given one of the separate display locations may be identified simply by the user's manual touch thereat and the coincident presence of an illuminated alphanumeric character or other symbol. The time-multiplexing logic, responsible for the illumination of the LED devices constituting that segment over the period of time when the touch is applied, will serve to identify the position touched by the operator. Where the overlay 164 is one including the outer cell electrode (as with the embodiment best viewed in FIG. 3) a pair of contact points from the conductive films will communicate with the driving/control circuitry for the display; should the alternate embodiment omitting that electrode be selected, but a single contact point will be required. As a further option, discrete cells such as those described above with reference to FIGS. 8 and 9 may comprise the overlay 164; in which case it is most preferred to dispose at least one discrete cell optically proximate each of the elements in the seven-segment character location.

Figure 12:
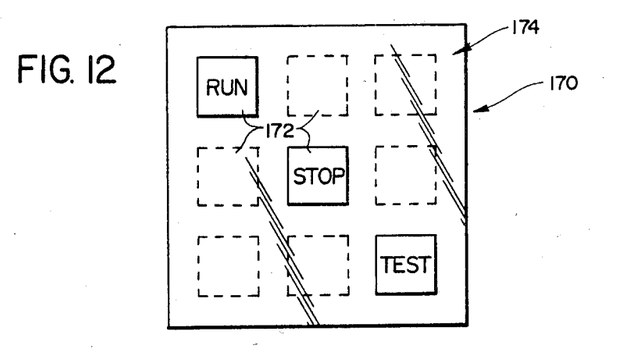

The description above is one made with reference to visual displays characterized broadly as presenting luminous character information by means of an excited phosphor, a light-emitting device, or similar means whereby information is presented by the selective illumination of characters or symbols. However, insofar as the overlay of the present invention is broadly applicable to any display where luminous information (or in some cases, the absence thereof) is converted by a photoreactive transducer to a measurable electric quantity, the present invention has a much broader reach than, e.g., CRT and/or LED displays. For example, a back-lit visual display where character information is presented in correlative regions, which can be translucent or partially opaque regions, may efficiently be associated with the instant touch-sensitive overlay. FIG. 12 exemplifies one such application.

It is now commonplace to provide certain host systems with a multiplicity of single-function switches of all manner and variety of construction. Vast panels of such switches may oftentimes be required in order to contemplate an equally vast series of options potentially to be presented to the system operator. These discrete switches are both costly and too often require elaborate interconnection among themselves and with the host system, further exacerbating the problem. The principles of the present touch-sensitive overlay may be extended to reduce substantially the need for such a vast array of single-function switches, simplify the operator's task in interacting with a system through the basic concept of opting for one of several choices in the milieu of single-functionality, and do so at a substantial cost reduction. FIG. 12 illustates one exemplary approach to that end.

A display panel identified generally as 170 is shown to contain a series of character locations identified as 172. In this example, nine such positions are shown, three of which bear the respective lengths "RUN", "STOP" and "TEST", while the balance of the nine positions remain in the event further options are required to be presented to the system operator. The display 170 is comprised of a back-lit panel where the level of illumination is sufficient to permit comfortable visual perception of the legends by the operator. A touch-sensitive overlay in accordance with the present invention, designated generally as 174, is disposed in cooperative, optically proximate engagement with the surface of the panel display 170 in order to permit operator interaction therewith.

Each of the legends appearing in the array of panel 170 may simply be inscribed on the panel itself. In that case, the size of the panel will approximate that for a conventional single-function switch display; although the interface complexity is substantially reduced by supplanting a considerable portion of large wiring bundles or cables with but a single or double contact required by the instant overlay.

While such permanently affixed legends will generally be found suitable, it is far more preferred to present the same via liquid crystal devices (LCD) which have now been refined to a commercially-reliable basis. The further advantage offered thereby is a substantial reduction in the physical size of a required panel insofar as options may be defined visually on the display 170 by conventional circuitry for LCD devices. Panels heretofore required to be several feet long may easily replaced by a smaller panel only large enough simply to contain sufficient character locations to present the maximum number of options presented to the operator at any given point in time; creating the specific legends as may be required via the LCD display.

Regardless of the manner in which the legend is developed, it can be seen with reference to FIG. 12 that three options are presented to the system operator, one of which is to be selected. In this example, either all of the positions 172 may be illuminated or, more preferably, simply the three corresponding to the choices presented. The most preferred method for the selective illumination of legend locations 172 is the selective sequencing of LED's associated with each position. A particular advantage of this approach is an entirely solid-state device of low power consumption, relying upon cycled LED's for illumination, LCD's for presentation, and the overlay of the present invention for interrogation. Alternatively, light wires communicating with an appropriate light source may be used for illumination and/or presentation of the legends or other character information. In any event, the operator may then make a suitable election among the choices presented which will be recognized upon a manual touch at the corresponding location. That touch and the coincident presence of back lighting will be recognized by the photoreactive transducer and, in turn, result in the generation of a characteristic logic pulse. The logic pulse communicates with the interfacing circuitry via either one or two contact points as may be required depending upon the embodiment selected for overlay 174.

Fabrication Methodology

The overlay in accordance with the present invention is as easily fabricated as it is efficient in operation. The discussion which ensues exemplifies various suggested methods for producing the overlays disclosed herein.

In those embodiments where an overlay in accordance with the present invention is comprised of a photovoltaic cell (whether continuous or discrete) associated with a conventional CRT display, fabrication is greatly facilitated. Most CRTs are provided with a glass implosion plate bonded or otherwise secured thereto to protect the face of the CRT and to protect those in its proximity in the event the same breaks (i.e., implodes). The first step is the deposition of a thin film of an optically transparent, electrically conductive material on the implosion plate. Various compositions meeting these functional requirements may be used, the preferred being tin oxide, indium-tin oxide and gold. Films as thin as about 2000–3000 Angstroms are now conventionally deposited and surface resistivity of less than 100 ohms per square achieved. The most preferred film is tin oxide deposited to yield surface resistivity on the order of about 30–50 ohms per square.

The photovoltaic cell borne upon the, e.g., tin oxide film is most preferably fabricated in place. Where the continuous mask is selected, the cell must possess optical transmissibility at least to the extent allowing for visual perception of the underlying display by the operator. In this case, the most preferred cell is a cadmium sulfide/cuprous sulfide cell having a light-responsive p-n junction which will convert light information from the display to an electric potential. These types of cells are preferably fabricated by first depositing a layer of cadmium sulfide on the conductive substrate and then reacting same with cuprous chloride to convert the outer surface of the cadmium sulfide to cuprous sulfide and thereby yield the active junction. Other techniques are known in the art, and might be used to equal advantage.

In instances where the outer cell electrode is to be included, the same is comprised of an inner, thin film of an electrically conductive, optically transparent material deposited upon an optically transparent substrate. The conductive film may be, e.g., one of the same enumerated above—tin oxide, indium-tin oxide and gold, amongst others. It is preferably deposited upon a resilient polymeric substrate such as the material marketed under the trademark Mylar. The substrate polymer is preferably stretch-formed, in order to provide it with the same radius of curvature as that of the CRT, prior to deposition of that conductive film. Subsequently, the outer cell electrode is bonded at the bezel along with the remaining components of the overlay with a peripheral spacer to maintain the needed separation between the electrode and cell. It may be found advantageous or otherwise desirable to include the plurality of non-conductive, intermediate spacers (76) about the inner surface of the cell electrode so that the same will not inadvertently be depressed against the cell and generate a spurious signal. A non-conductive material may be screened by conventional techniques onto the film after it has been deposited on the substrate in order to achieve that result.

In situations where the photovoltaic cell omits the outer electrode, a hard coat of a dielectric material is applied over the top surface of the cell in order to protect the cell and also provide good response to the operator's touch for developing the characteristic logic pulse. Again, these materials and their methods for application are now quite conventional and detailed description thereof is unwarranted herein.

The formation of a touch-sensitive overlay in accordance with the present invention where the photoreactive transducer is in the form of discrete cells is equally well a simple and straightforward task. Cell precursor is first deposited upon the underlying film of, e.g., tin oxide and to that precursor is applied a photoresist leaving active areas where transducers are to be formed. This broadens considerably the range of compositions which might be used insofar as there is no strict requirement on the optical transmissibility of these cells. Where the cells themselves do not provide such transmissibility, the same will normally be sized on the order of about 0.005" in dimension (e.g., diameter) and spaced in the appropriate coordinate array (e.g., X-Y polar). The precursor material in the non-active area may be stripped should the same lack suitable optical transmissibility or indeed may be retained if that is not the case. Should an outer cell electrode be elected for combination with the discrete cell transducer, it will be fabricated in the manner noted above; if that element is omitted, the same type of hard coating process noted above will then be employed.

Fabrication of overlays which employ other than a photovoltaic cell for the transducer follows conventional techniques in much the same way as noted above. For example, Schottky devices may be deposited in a desirable cell array to form a photoreactive mask following known techniques. Photoresistive materials such as cadmium sulfide (which offers the added advantage of optical transparency) are of equal ease in terms of deposition to form the photoreactive member. Those skilled in the art will appreciate that other transducer materials might be employed and, in some instances, departures from the exemplary techniques set forth above may be required. However, guided by the principles set forth herein, the skilled artisan will have no difficulty in designing and implementing a touch-sensitive overlay given the exigencies of the application at hand.

As is now readily apparent, the touch-sensitive overlays in accordance with one or more of the preferred embodiments set forth herein effectively overcome the drawbacks inhering in the conventional devices heretofore in use. Simplicity of fabrication and operation are hallmarks of the present design, as is a greatly reduced cost for implementation. The overlays of the present invention admit of a wide range of applications where character or symbol information is presented on a positioned-multiplexed basis in a manner whereby a photoreactive transducer will sense either the presence of luminous information or absence thereof in order to convert that condition into a measurable electric quantity which, in turn, serves to provide a characteristic logic pulse for determining that position.

While the invention has now been described with reference to certain preferred embodiments and exemplified in respect thereof, those skilled in the art will appreciate that various substitutions, modifications, changes and omissions may be made without departing from its spirit. Accordingly, it is intended that the foregoing description of the present invention be interpreted as exemplary of the preferred implementation(s) of the instant overlay and not be deemed limitative of its scope in terms of construction, fabrication methodology and/or applications.

I claim:

1. A touch-sensitive overlay for placement on a visual display including a system for illuminating areas at a plurality of locations in said display and responsive to an electrical signal to provide an indication of an illuminated area location in said display, comprising: a substantially transparent sheet having a plurality of discrete photoreactive transducer means distributed thereon and placeable over said illuminated area location, the photoreactive transducer means having at least one photoelectric characteristic which varies as a function of incident light from said illuminated area location in said display impinging said transducer means, and circuit means for obtaining from said transducer means said electrical signal in response to a variation of said photoelectric characteristic due to incident light from said illuminated area in said display at said transducer means coincident with an external touch of said overlay to identify the location of said touch relative to said display.

2. The touch-sensitive overlay of claim 1, wherein said circuit means includes an optically transparent conductor in contact with said transducer means.

3. The touch-sensitive overlay of claim 1, wherein said sheet includes a plurality of discrete, open, photovoltaic cells disposed in a cell array over said display.

4. The touch-sensitive overlay of claim 3, wherein said cell array conforms substantially to the geometric conformation of said plurality of said locations.

5. The touch-sensitive overlay of claim 4, wherein each of said photovoltaic cells is an optically non-transparent cell.

6. The touch-sensitive overlay of claim 4, further comprising a flexible cell electrode disposed in electrically spaced relationship from said open photovoltaic cell for contact therewith upon a touch thereof.

7. The touch-sensitive overlay of claim 6, wherein said flexible cell electrode is comprised of a thin film of an optically transparent, electrically conductive composition borne on a flexibly resilient, optically transparent polymeric substrate.

8. The touch-sensitive overlay of claim 7, wherein said thin film is selected from the group consisting of tin oxide, indium-tin oxide and gold films.

9. The touch-sensitive overlay of claim 4, further comprising a flexible cell electrode disposed in electrically spaced relationship from said open photovoltaic cell for contact therewith upon a touch thereof.

10. The touch-sensitive overlay of claim 9, wherein said flexible cell electrode is comprised of a thin film of an optically transparent, electrically conductive composition borne on a flexibly resilient, optically transparent polymeric substrate.

11. The touch-sensitive overlay of claim 10, wherein said thin film is selected from the group consisting of tin oxide, indium-tin oxide and gold films.

12. The touch-sensitive overlay of claim 1, wherein said transducer means comprises a plurality of discrete, open, optically transparent photovoltaic cells.

13. The touch-sensitive overlay of claim 12, wherein each said cell is supported on a substrate comprising an optically transparent, electrically conductive film.

14. The touch-sensitive overlay of claim 13, wherein each said photovoltaic cell is comprised of a photovoltaic semiconductor mask having a light-responsive junction.

15. The touch-sensitive overlay of claim 14, wherein each said photovoltaic cell is comprised of a cadmium sulfide/cuprous sulfide semiconductor.

16. The touch-sensitive overlay of claim 15, wherein said semiconductor is deposited upon a thin film selected from the group consisting of tin oxide, indium-tin oxide and gold films.

17. The touch-sensitive overlay of claim 14, further comprising a flexible cell electrode disposed in electrically spaced relationship from said open photovoltaic cells for contact therewith upon a touch thereof.

18. The touch-sensitive overlay of claim 17, wherein said flexible cell electrode is comprised of a thin film of an optically transparent, electrically conductive composition borne on a flexibly resilient, optically transparent polymeric substrate.

19. The touch-sensitive overlay of claim 18, wherein said thin film is selected from the group consisting of tin oxide, indium-tin oxide and gold films.

20. The touch-sensitive overlay of claim 1 or 2, wherein said visual display includes a CRT display and said illuminated area is created by the raster scan thereof.

21. The touch-sensitive overlay of claim 20, wherein said CRT display includes raster scan counter means for controlling and monitoring the raster scan of said display, and further wherein said signal means comprises pulse developing means generating said characteristic logic pulse for interrogation of said scan counter means to identify raster location at the time of said touch.

22. The touch-sensitive overlay of claim 1 or 2, wherein said visual display is comprised of a back-lit display of physically defined character locations.

23. The touch-sensitive overlay of claim 22, wherein said back-lit display includes illumination means for creating luminous character information at said character locations on a time-multiplexed basis.

24. The touch-sensitive overlay of claim 1 or 2, wherein said display is a time-multiplexed array of discrete character locations selectively illuminated to yield said luminous character information.

25. The touch-sensitive overlay of claim 24, wherein said display includes time-multiplexing circuit means for controlling and monitoring the illumination of said discrete locations, and further wherein said signal means comprises pulse developing means generating said characteristic logic pulse for interrogation of said time-multiplexing circuit means to identify the character location(s) illuminated at the time of said touch.

26. A touch sensitive overlay for placement over a visible light emitting display, comprising:
   a transducer including a photoreactive member responsive to incident light from a raster source in said display to generate an electrical signal at a location on said transducer subject to said incident light, said transducer further including an ungrounded conductive member in conductive engagement with said photoreactive member for disposition between said display and said photoreactive member;
   timing circuit means connected to a ground for controlling said raster source to scan the light emitting display and for determining the instantaneous location of light on the transducer produced by the display; and
   signal means conductively connected to said ungrounded conductive member and said circuit means for establishing a signal path between said photoreactive member and said ground; said signal means responsive to capacitive coupling to ground by an external touch at said location on said transducer subject to said incident light to complete an electrical connection to ground;
   said timing circuit means including means for determining a location of said light emission in said display coincident with said touch.

27. The touch sensitive overlay of claim 26 including a transparent nonconductive overcoating disposed on said transducer opposite said conductive member.

28. The touch sensitive overlay of claim 27 wherein said photoreactive means includes at least one photovoltaic cell overlying said visible light emitting display and said photovoltaic cell comprises a photovoltaic semiconductor mask having a light responsive junction.

29. The touch sensitive overlay of claim 28 wherein said visible light emitting display comprises a cathode ray tube and wherein said timing circuit means includes raster scan counter means for controlling and monitoring the raster scan in said display, said raster scan counter means responsive to said electrical signal to output said raster location.

30. The touch sensitive overlay of claim 29 wherein said signal means includes a grounded resistance connected to said conductive member and an operational amplifier having one input connected to said conductive member and a second input grounded, said operational amplifier having an output connected to said raster scan counter means.

31. The touch sensitive overlay of claim 30 wherein said raster scan counter means controls the raster scan to provide a plurality of trace scans in one direction and a plurality of retrace scans in the opposite direction, and said signal means includes gating means connected to said operational amplifier to gate said electrical signal to said circuit means only during said trace scans.

32. A touch sensitive overlay for placement over a visible light emitting display, comprising:
   a transducer including a photoreactive member responsive to incident light from a raster source in said display to generate an electrical signal at a location on said transducer subject to said incident light, said transducer further including a grounded conductive member in conductive engagement with said photoreactive member for disposition between said display and said photoreactive member;

timing circuit means connected to ground and responsive to the raster for determining the instantaneous location of the light incident on the photoreactive member;

a flexible, ungrounded conductive member spaced from said photoreactive member of said transducer and disposed outwardly of said transducer whereby said transducer is disposed between said visible light emitting display and said ungrounded conductive member, said ungrounded conductive member responsive to an external touch at a location thereon to flex into conductive engagement with said photoreactive member; and signal means conductively connected to said conductive member and said timing circuit means, said signal means responsive to conductive engagement of said ungrounded conductive member and a location on said transducer coincident with said incident light on said transducer to complete an electrical connection and provide said electrical signal between said photoreactive member and said timing circuit means;

said timing circuit means including means for determining a location of said light emission in said display coincident with said touch.

33. The touch sensitive overlay of claim 32 wherein said photoreactive means includes at least one photovoltaic cell overlying said visible light emitting display and said photovoltaic cell comprises a photovoltaic semiconductor mask having a light responsive junction.

34. The touch sensitive overlay of claim 33 wherein said signal means includes a resistance connected between said ungrounded conductive member and said grounded conductive member, and said signal means includes a comparator having a first input connected to said conductive member and an output connected to said circuit means, and a reference voltage source connected to a second input of said comparator, a reference resistor connecting said second input of said comparator to said grounded conductive member.

* * * * *